United States Patent [19]
Dyer

[11] Patent Number: 5,379,632
[45] Date of Patent: Jan. 10, 1995

[54] METHOD OF TESTING A GAS COOLED ELECTRICAL GENERATOR

[75] Inventor: Glenn E. Dyer, Ocala, Fla.

[73] Assignee: Westinghouse Electric Corporation, Pittsburgh, Pa.

[21] Appl. No.: 968,646

[22] Filed: Oct. 29, 1992

[51] Int. Cl.$^6$ ............................................. G01M 3/32
[52] U.S. Cl. ............................................................. 73/40
[58] Field of Search ............................... 73/40, 40.5 R

[56] References Cited

U.S. PATENT DOCUMENTS 3,122,668  2/1964  Cuny ................................. 73/40 X

FOREIGN PATENT DOCUMENTS

| 978221 | 4/1951 | France . | |
| 1106095 | 5/1961 | Germany . | |
| 39803 | 3/1979 | Japan | 73/40 |
| 1533 | 1/1985 | Japan | 73/40 |
| 60-66644 | 4/1985 | Japan . | |

OTHER PUBLICATIONS

Yu N. Zhigulin, Leak Tests on Large Vessels, Measurement Techniques, vol. 18, No. 8, pp. 1206–1208, 1976.

Primary Examiner—Hezron E. Williams
Assistant Examiner—Joseph W. Roskos
Attorney, Agent, or Firm—M. G. Panian

[57] ABSTRACT

A method of testing a gas-cooled electrical generator (12) for leakage of pressurized coolant gas includes steps of communicating a container (14) with pressurized coolant gas that is within the generator (12); sealing the container (14) once the container (14) becomes filled with coolant gas at a pressure which is equal to a pressure within the sealed space; and subsequently comparing the pressure in the sealed space with the pressure in the sealed container (14), whereby a lower pressure in the sealed space will indicate coolant leakage. Preferably, the container (14) is insulated to preserve the coolant gas at the temperature it was at within the generator (12), for accurate measurements. In contrast to previously known methods, this method can be performed while the generator is operational, resulting in improved and more realistic detection and measurement of leakage.

6 Claims, 1 Drawing Sheet

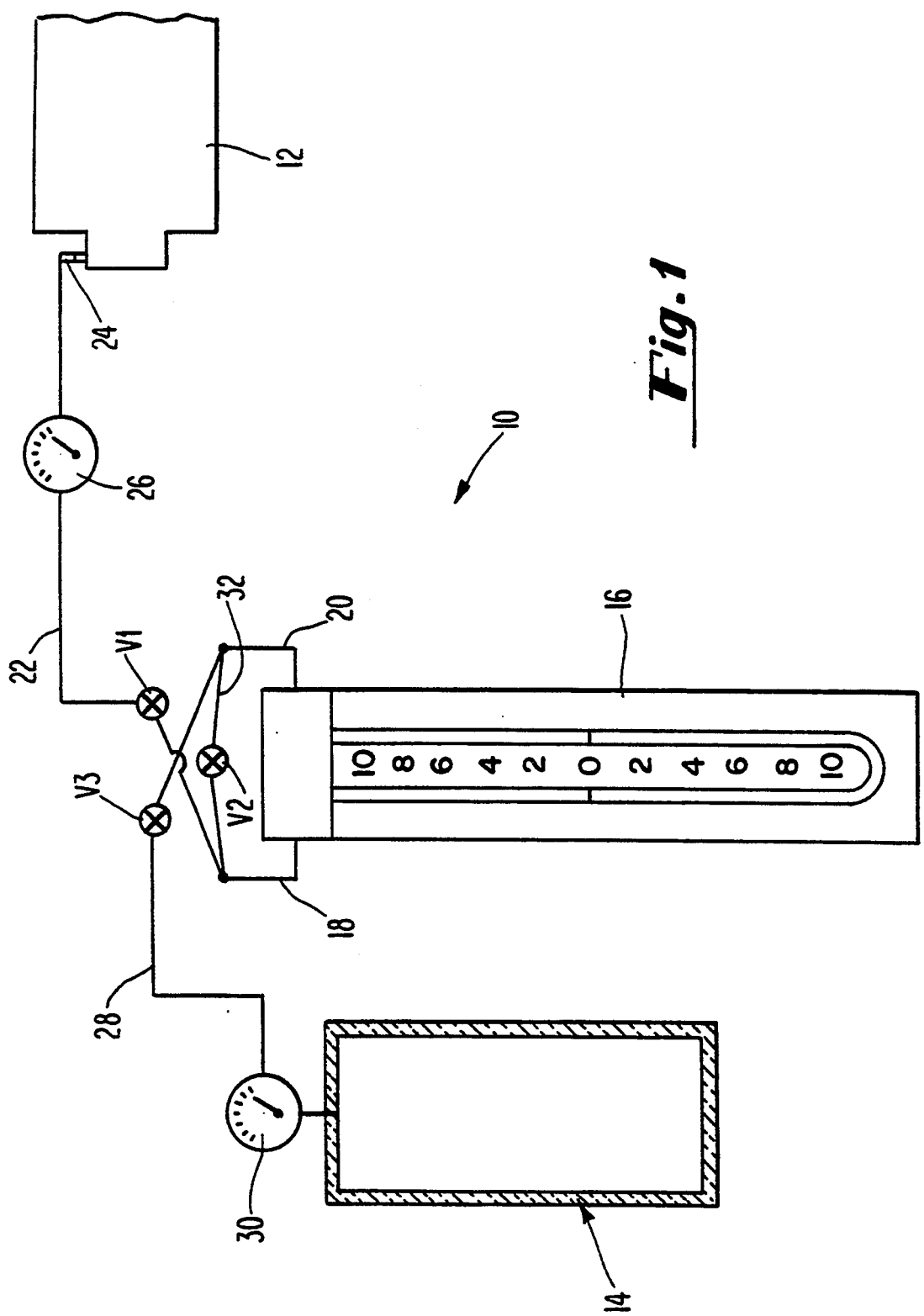

5,379,632

METHOD OF TESTING A GAS COOLED ELECTRICAL GENERATOR

FIELD OF THE INVENTION

This invention relates to systems which are used for testing electrical generators for coolant gas leakage.

DESCRIPTION OF THE PRIOR ART

Large electrical generators of the type which are manufactured by Westinghouse Electrical Company, the assignee of this invention, typically are cooled by inducing a coolant gas to flow through heat generating portions of the generator, such as the stator windings. The cooling gas is usually hydrogen.

Hydrogen leakage from the generator constitutes a potential efficiency and safety hazard. The inherent danger of hydrogen exposure to air requires that the generator be completely sealed. Over time, however, temperature variations and vibration effects cause wear on such seal-related components as joints, welds and seals, which can result in hydrogen leakage.

Conventionally, testing a generator for hydrogen leaks has been a time consuming, expensive process. In one such technique, the generator must first be purged of hydrogen gas, which is done by forcing carbon dioxide into the generator to replace the hydrogen. The carbon dioxide is then forced out of the generator by displacing it with air. A pressure tank is inserted into the generator through an inspection hatch and the interior of the generator is then pressurized with the pressure tank in it. The pressure tank is then closed, and the pressure differential between the pressure tank and interior of the generator is monitored. If the pressurized air leaks out of the interior of the generator, the interior of the generator will gradually lose pressure with respect to the air in the sealed container. By this method, the rate of leakage from the generator may be calculated. The leaks may then be located with the use of soapy water and/or Freon TM for subsequent repair.

Unfortunately, such conventional testing techniques have several inherent disadvantages. Flushing the coolant gas out of the system is expensive and time consuming. Moreover, the generator cannot be operated during such a testing process. In addition, the leakage characteristics of the generator when pressurized with air are slightly different than the leakage characteristics of the generator when it is pressurized with the actual hydrogen coolant.

It is clear that there has existed a long and unfilled need in the prior art for a method of testing electrical generators for coolant gas leaks which is less expensive and time consuming than conventional methods, and which can be performed without shutting down generator operation.

SUMMARY OF THE INVENTION

Accordingly, it is an object of the invention to provide an improved method for testing an electrical generator for coolant gas leakage which is less expensive and time consuming than conventional methods.

It is further an object of invention to provide an improved method for detecting and measuring coolant gas leakage from an electrical generator, which can be performed without operationally disabling the generator.

In order to achieve the above and other objects of the invention, a method of testing a gas cooled electrical generator for leakage of pressurized coolant gas includes, according to a first aspect of the invention, the steps of (a) communicating a container with pressurized coolant gas that is within a sealed space in the generator; (b) sealing the container once the container becomes filled with coolant gas at a pressure which is equal to a pressure within the sealed space; and (c) subsequently comparing the pressure in the sealed space with the pressure in the sealed container, whereby a lower pressure in the sealed space will indicate coolant leakage.

According to a second aspect of the invention, a method of testing a gas cooled electrical generator for leakage of pressurized coolant gas includes the steps of (a) communicating an insulated container with pressurized gas that is within a sealed space in the generator; (b) sealing the insulated container once the insulated container becomes filled with the gas at a pressure which is equal to a pressure within the sealed space; and (c) subsequently comparing the pressure in the sealed spaced with the pressure in the insulated container, whereby a lower pressure in the sealed space will indicate leakage of the gas, the insulation of the container insuring an accurate indication of whether any leakage is present.

According to a third aspect of the invention, a method of testing a gas cooled electrical generator for leakage of pressurized coolant gas includes the steps of (a) communicating, while the generator is operating, a container with pressurized coolant gas that is within a sealed space and the generator; (b) sealing the container once the container becomes filled with coolant gas at a pressure which is equal to a pressure within the sealed space; and (c) subsequently comparing, while the generator is operating, the pressure in the sealed space with the pressure in the sealed container, whereby a lower pressure in the sealed space will indicated coolant leakage.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 1 is a schematic depiction of a system which is used to perform a method of testing a gas cooled electrical generator for leakage of pressurized coolant gas according to a preferred embodiment of the invention.

DETAILED DESCRIPTION OF THE PREFERRED EMBODIMENT(S)

Referring now to FIG. 1, a system 10 for testing a gas cooled electrical generator for leakage of pressurized coolant gas such as hydrogen is schematically shown juxtaposed to a gas cooled electrical generator 12.

As may be seen in FIG. 1, system 10 includes an insulated container 14 and a manometer 16, which has a first side 18 and a second side 20. Manometer 16 may be a U-tube type or digital type. The preferred model at this point is a model number LP 2000C digital manometer from Meriam Instrument Co. of Cleveland, Ohio.

A pressure line 22 is communicated with the interior of the outer vessel of generator 12 via an adapter 24. A second, opposite end of pressure line 22 is communicated with the first side 18 of manometer 16, with a first valve $V_1$ interposed therein. A pressure gauge 26 is also interposed in pressure line 22 between first valve $V_1$ and generator 12.

As may further be seen in FIG. 1, a second pressure line 28 is provided to communicate an interior space of insulated container 14 with the second side 20 of manometer 16. A third valve $V_3$ is interposed in pressure line 28. A pressure gauge 30 is further interposed in pressure line 28, between third valve $V_3$ and insulated container 14.

A second valve $V_2$ is interposed in a third pressure line 32 which communicates the first and second sides 18, 20 of manometer 16.

System 10 operates as follows. First, second valve $V_2$ is open, thus equalizing the pressure between the first side 18 and the second 20 of manometer 16. Pressure line 22 is then communicated with the interior of generator 12 via adapter 24. Valve $V_3$ is then opened, communicating the insulated container 14 with the second side 20 of manometer 16. Valve $V_1$ is then opened, communicating the interior of generator 12 with the first side 18 of manometer 16. At this point, the coolant gas in generator 12 will flow through pressure line 22 to the first side 18 of manometer 16, then through pressure line 32 to the second side 20 of manometer 16, and finally through pressure line 28 into the interior of insulated container 14, until the pressure between the interior of insulated container 14 and the interior of generator 12 is equalized.

The pressure equalization process may take some time, up to about two minutes. Once the pressures have been equalized, second valve $V_2$ is closed. As time elapses, leakage from generator 12 will cause the pressure within the interior of generator 12 to fall beneath the pressure in insulated container 14. This pressure differential is measured by the manometer 16. By knowing the internal volume of generator 12, the length of time which has elapsed from the closing of valve $V_2$ and the pressure differential measured by manometer 16, the leakage rate from generator 12 may be calculated. Specifically, such leakage may be calculated according to the following formula:

$$L = .0588(VP/T); \text{ where}$$

L = Leakage (FT$^3$)/DAY)
V = Volume of Generator (FT$^3$)
P = Pressure Differential (Inches of Water)
T = Time (Hours)

One significant advantage of the method that is provided by the invention is that the leakage rate of coolant gas from the generator 12 may be determined while the generator 12 is in operation. This results in a more accurate reading than was heretofore possible, and results in less of a hiatus of operation for the generator 12. Moreover, the method of the present invention does not necessitate the flushing of the cooling system in generator 12, as was required in conventional methods.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

I claim:

1. A method of testing a gas-cooled electrical generator for leakage of pressurized coolant gas, comprising:
   (a) communicating a container with pressurized coolant gas that is within a sealed space in said generator, said container being positioned externally of said generator;
   (b) sealing said container once said container becomes filled with coolant gas at a pressure which is equal to a pressure within said sealed space;
   (c) subsequently comparing the pressure in said sealed space with the pressure in said sealed container, whereby a lower pressure in said sealed space will indicate coolant leakage; and
   (d) determining the rate of leakage from said sealed space based on the pressure comparison performed in step (c).

2. A method according to claim 1, wherein said method is performed while the generator is operative.

3. A method according to claim 1, wherein step (c) is performed with a manometer.

4. A method of testing a gas-cooled electrical generator for leakage of pressurized coolant gas, comprising:
   (a) communicating an insulated container with pressurized coolant gas that is within a sealed space in said generator, said insulated container being positioned externally of said generator;
   (b) sealing said insulated container once said insulated container becomes filled with coolant gas at a pressure which is equal to a pressure within said sealed space;
   (c) subsequently comparing the pressure in said sealed space with the pressure in said insulated container, whereby a lower pressure in said sealed space will indicate coolant leakage; and
   (d) wherein said method is performed while the generator is operative.

5. A method according to claim 4 wherein step (c) is performed with a manometer.

6. A method according to claim 5, further comprising the step of:
   (d) determining the rate of leakage from said sealed space based on the pressure comparison performed in step (c).

* * * * *